Oct. 30, 1956   F. R. HULL   2,768,835
RETRACTIBLE CARRIAGE MOUNTING
Filed June 27, 1955   2 Sheets-Sheet 1
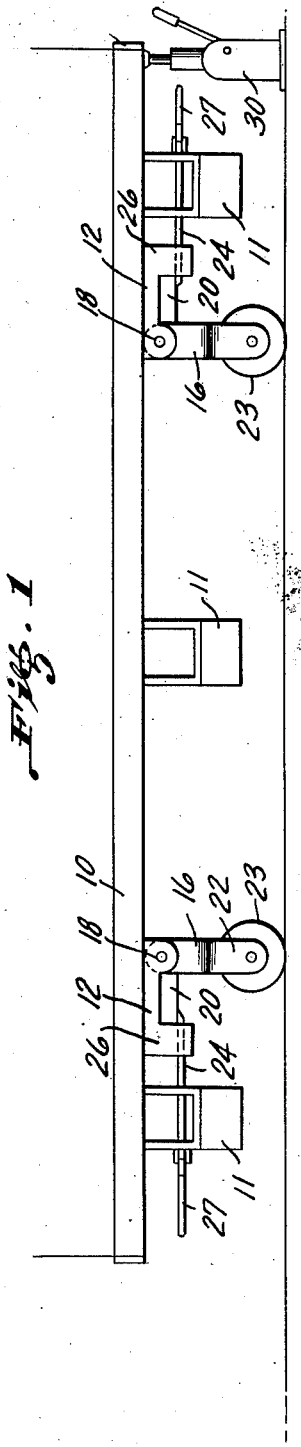
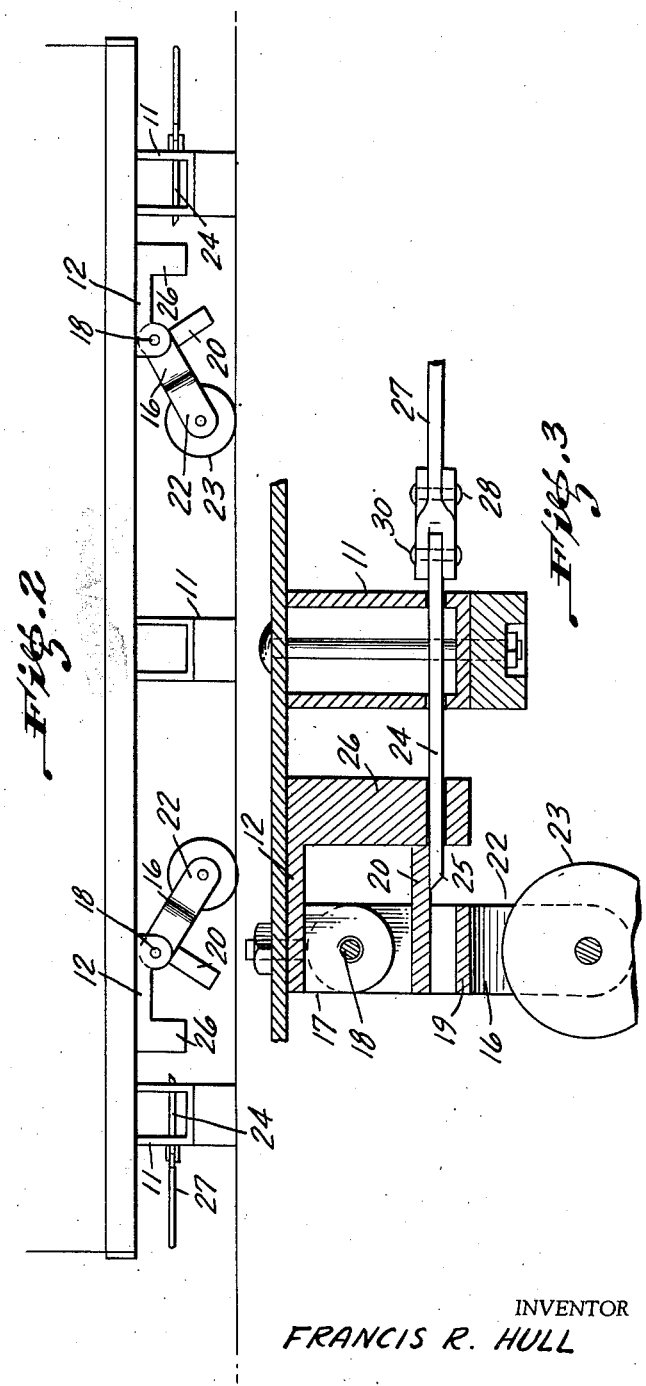
INVENTOR
FRANCIS R. HULL
BY
ATTORNEY

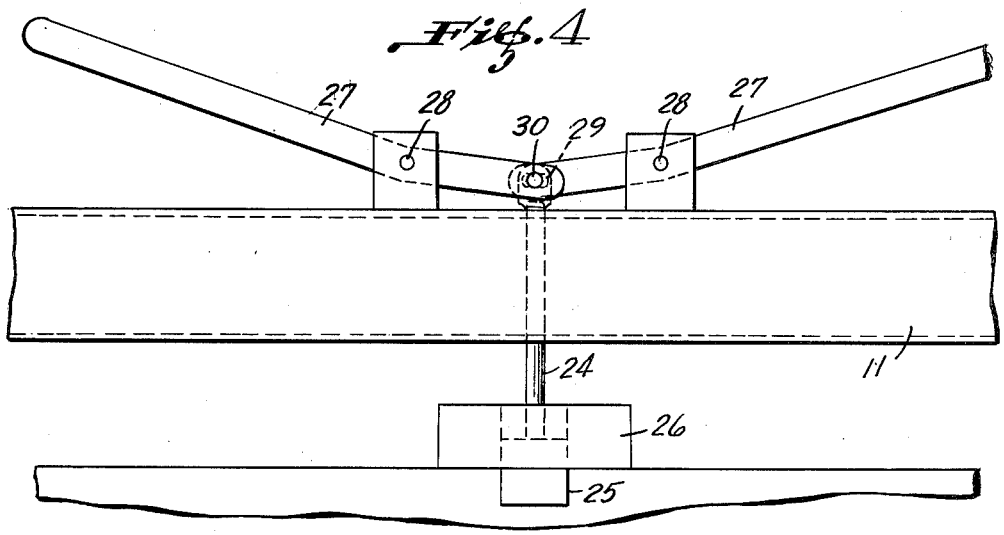

United States Patent Office 2,768,835
Patented Oct. 30, 1956

2,768,835

RETRACTIBLE CARRIAGE MOUNTING

Francis R. Hull, Macungie, Pa.

Application June 27, 1955, Serial No. 518,205

4 Claims. (Cl. 280—43)

This invention is a retractible carriage member, applicable either to boxes, cases or crates to contain goods or merchandise, or to a vehicle for supporting such containers, capable of supporting the load for movement over a supporting surface and also capable of being readily moved to retracted or inoperative position when the load has reached a predetermined location in order that the carriage or container may rest solidly and firmly upon its supporting sills.

The primary object of the invention is to provide a retractible carriage mounting constructed as an attachment either to a vehicle or a case or container, which involves mechanism of such construction as to permit of its ready attachment to either the container or the carriage, which, when in operative position, permits the load to be readily maneuvered over a supporting surface to a desired location, and which includes means of simple nature to enable retraction of the carriage to inoperative position permitting the load to rest upon its usual supporting sills.

A further object of the invention is to provide means associated with either a container or carriage to permit easy movement or maneuverability of the same when desired, including means for rigidly maintaining the maneuvering mechanism in operative position at such times, and which includes readily operated means to permit retraction of the carriage members to inoperative position when a predetermined location of the load has been reached, whereby the latter may be enabled to rest firmly and securely upon its sills.

A still further object resides in improved mechanism of simple construction and nature, capable of being easily attached to a packing case or supporting vehicle to permit of ready maneuverability of the latter, and which also includes simple and easily operated mechanism to bring about retraction of the supporting carriage to inoperative position when the load has reached a desired location.

With the foregoing objects in view, together with others which will appear as the description proceeds, the invention resides in the novel construction, combination and arrangement of parts, all as will be described more fully hereinafter, illustrated in the drawing, and particularly pointed out in the claims.

In the drawing:

Fig. 1 is a side elevation of a conventional form of container or carriage and illustrating retractible carriage structure connected therewith and moved to projected or operative position to permit the load to be moved about, Fig. 2 is a similar view showing the supporting carriage structure moved to retracted or inoperative position, Fig. 3 is an enlarged fragmentary transverse sectional view taken through one of the supporting carriages and showing the details of the locking mechanism when the carriage is in projected or operative position, Fig. 4 is a bottom plan view of a portion of a supporting sill and the locking arm, also showing the latch mechanism and means whereby it is operated, Fig. 5 is a fragmentary bottom plan view, on a reduced scale, of the container or carriage and showing the parts of the retractible frame and latching mechanism in the position they will assume with the carriage frame in projected or operative position, Fig. 6 is an edge view of the hinge base employed in carrying out the invention, Fig. 7 is a bottom plan view of the base shown in Fig. 6, Fig. 8 is a bottom plan view of the carriage frame, and Fig. 9 is a front elevation of the carriage frame unit.

The device of this invention involves structure to be applied to the under or supporting surface of either a shipping case or a carriage for the support of shipping cases including roller carriages at each end thereof so mounted as to be readily moved to operative position when the body with its load has been elevated upon ordinary lifting jacks, which includes improved latching mechanism for firmly maintaining the carriage units in operative or projected positions, and which mechanism may be easily operated to release the carriage units so that they may be swung to retracted or inoperative position when the desired location of the load has been reached.

In carrying forth this idea, Fig. 1 discloses a side elevation of a body or load frame 10 which is of substantially rectangular form, and may comprise a carriage for the support of a load or it may be a case itself which contains the load. This frame or body is provided, as usual, with spaced parallel skids or sills 11 upon which it rests when in fixed position. The carriage mountings or units of my invention are applied to the underside of the vehicle, one of said units at each end thereof and disposed transversely, each unit being hinged to the underside of the frame 10 in such manner as to be swung to either operative or inoperative position. Each unit includes a hinge base of substantial metal indicated at 12, rigidly or firmly affixed to the bottom of the frame 10 near each end thereof and in transverse relationship thereto. This base is provided at each end with spaced ears 13 having aligned openings 14 therein for the reception of hinge pins 18 to rotatably receive the upper ends of caster posts 16. The ears 13 are arranged transversely of the hinge base 12 so that the caster posts 16 swing in directions longitudinally of the base 10.

Each caster post is provided with an upstanding ear 17 having an opening therein to receive the hinge pin 18 passing through the ears 13 of the hinge base. Each of the caster posts is connected by a spreader bar 19, also a latch plate 20. These elements lend rigidity to the structure and assure proper swinging movement of the unit. Each of the caster posts is provided with a recess to receive the yoke post 21 of yoke 22 carrying the caster wheel 23.

Mounted for sliding movement longitudinally of the frame 10, upon the underside thereof, and midway of the lateral edges of the frame is a latch bar 24, one of said bars being provided for each of the retractible units. It is preferred that these latch bars be slidably mounted in the adjacent sill member 11. Each bar is provided at its operative end with an enlarged head 25 slidably engaged in a latch housing 26 either integral with or rigidly secured to the hinge base 12 intermediate the ends thereof. The latch pin is provided at its opposite end with a yoke to receive the inner ends of latch operating levers 27 hinged as at 28 to the adjacent sill and having elongated slots 29 at their inner ends to receive the connecting pin 30 carried by the yoke of the latch pin. It is apparent from this construction that depressing movement of either of the levers 27 will cause the latch pin 24 to be retracted, disengaging its head 25 from the slot in the latch housing 26. When so moved, the carriage units are free to swing upon their hinge pins 18 to inoperative or retracted positions. Each latch plate 20 is so assembled with its unit as to overlie the opening in the latch housing 26 when the units are in erect or operative supporting positions, so that the latch pin head 25 will underlie the latch plate and firmly maintain the carriage unit in erect or operative position. It will be observed that the length of the swivel post 16 and the rollers carried thereby is greater than the depth of the supporting sills 11, so that when the carriage units are in erect or operative position, the body 10 will have been moved upward, along with its sills, until the latter clear the supporting surface and the load is entirely supported by the carriage units. However, when the latches have been retracted and the carriage units released, they may swing inwardly of the base 10 to the position shown in Fig. 2 of the drawings, allowing the load to rest upon its sills 11. It will be understood that when it is desired to utilize the carriage units, ordinary lifting jacks, such as represented at 30 in Fig. 1, will be employed to lift the load on the carriage 10, whereupon the carriage units will automatically swing to operative position to be engaged by the latch members 25. The reverse of this operation is carried out when the vehicle has reached the desired position to be rested upon its sills.

From the foregoing it is apparent that I have provided comparatively simple and inexpensive means for bringing about operative movement of the carriage units in order that the load may be readily maneuvered, such means being capable of being operated from either side thereof and at the ends to release the carriage units for swinging movement to inoperative position when desired.

I claim:

1. A retractible carriage for containers having supporting sills depending therefrom; a wheel frame hinged to the underside of said container independently of and remote from said sills, wheels carried by said frame, the supporting surfaces of said wheels disposed below the plane of the supporting surfaces of said wheels when said frame is in projected position, a latch slidable upon one of said sills to hold said frame in projected position, and a lever mounted on said sill to withdraw said latch from engagement from said frame.

2. A retractible carriage for containers having supporting sills depending therefrom; a wheel frame comprising a pair of standards arranged in spaced parallelism at opposite sides of said container at the underside thereof, a spreader bar connecting said standards, pivots connecting the upper ends of said standards to the bottom of said container, supporting wheels rotatably mounted at the opposite ends of said standards, the distance between said pivots and the supporting surfaces of said wheels being greater than the depth of said sills, a latch bar connecting said standards, a latch slidably mounted beneath said container to engage said latch bar to hold said frame at substantially right angles to the bottom of said container, and a lever operable from an end of said container to release said latch.

3. A retractible carriage for containers having supporting sills depending therefrom; a wheel frame comprising a pair of standards arranged in spaced parallelism at opposite sides of said container and beneath the latter, pivots connecting the upper ends of said standards to the bottom of said container, supporting wheels rotatably mounted at the lower ends of said standards, the distance between said pivots and the supporting surfaces of said wheels being greater than the depth of said sills, a latch plate connecting said standards, a latch housing rigid with said container adapted to receive said latch plate when said standards are perpendicular to the bottom of said container, and a latch extending through said latch housing to engage said latch plate and hold the same in said perpendicular position.

4. A retractible carriage for containers having supporting sills depending therefrom; a hinge base connected to the underside of said carriage transversely thereof, a latch housing connected to said hinge base, a carriage comprising a pair of spaced standards, hinge pins connecting said standards to the ends of said hinge base, a latch plate connecting said standards adapted to swing into operative position with respect to said latch housing when said standards are perpendicular to said carriage, a latch bar extending transversely through one of said sills and through said latch housing, a pair of oppositely disposed levers hingedly connected inwardly of their ends to said sill, a pivot pin connecting the meeting ends of said levers to the outer end of said latch bar whereby the latter may be extended or retracted upon swinging movement of either of said levers, and supporting rollers hingedly connected to the outer ends of said standards.

References Cited in the file of this patent
UNITED STATES PATENTS

| | | |
|---|---|---|
| 905,759 | Strauss | Dec. 1, 1908 |
| 1,027,686 | Bollinger | May 28, 1912 |
| 1,812,890 | McWhorter | July 7, 1931 |